United States Patent
Uno et al.

(10) Patent No.: US 6,663,247 B1
(45) Date of Patent: Dec. 16, 2003

(54) REFLECTING MIRROR UNIT

(75) Inventors: Koji Uno, Tokyo (JP); Masahiko Hasegawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 50 days.

(21) Appl. No.: 10/110,975

(22) PCT Filed: Aug. 31, 2000

(86) PCT No.: PCT/JP00/05908

§ 371 (c)(1),
(2), (4) Date: Apr. 18, 2002

(87) PCT Pub. No.: WO02/19007

PCT Pub. Date: Mar. 7, 2002

(51) Int. Cl.[7] .............................. G02B 5/08; G02B 7/198
(52) U.S. Cl. ...................... 359/874; 359/872; 359/873; 359/876; 248/479; 74/89.45
(58) Field of Search ................................ 359/872, 874, 359/873, 876, 896; 248/466, 479, 481

(56) References Cited

U.S. PATENT DOCUMENTS

| | | | |
|---|---|---|---|
| 3,357,268 A | * | 12/1967 | Richter |
| 3,588,025 A | * | 6/1971 | Gersman |
| 3,642,353 A | * | 2/1972 | Field |
| 4,088,396 A | * | 5/1978 | Edelstein |
| 4,925,286 A | * | 5/1990 | Cutburth |
| 6,198,580 B1 | * | 3/2001 | Dallakian ................ 359/822 |

FOREIGN PATENT DOCUMENTS

| | | | |
|---|---|---|---|
| JP | 63-164701 | | 10/1988 |
| JP | 05-273455 A | * | 10/1993 |
| JP | 06-175007 A | * | 6/1994 |
| JP | 06-250073 A | * | 9/1994 |
| JP | 08-068931 A | * | 3/1996 |
| JP | 11-271595 A | * | 10/1999 |
| JP | 2000-1676863 A | * | 6/2000 |

* cited by examiner

*Primary Examiner*—John Juba
(74) *Attorney, Agent, or Firm*—Sughrue Mion, PLLC

(57) ABSTRACT

A reflecting mirror unit according to the present invention comprises a mirror, mirror holding arrangement for holding the periphery of the mirror, in which an outer circumferential portion perpendicular to a reflection surface of the mirror is shaped like a circular arc in cross section, a first carrier that is contact with a part of the outer circumferential portion on the mirror reflection surface side for the mirror holding arrangement at a part of its inner conical surface, a second carrier that is opposed via the mirror holding arrangement to the first carrier, and is contact with a part of the outer circumferential portion on the mirror back face side for the mirror holding arrangement at a part of the inner conical surface, and pressure securing arrangement for pressing the first carrier and the second carrier against the mirror holding arrangement. The mirror can be securely retained in a fixed state after adjusting the angle of the mirror, and the reflecting mirror unit can be reduced in size and weight.

3 Claims, 6 Drawing Sheets

REFLECTING MIRROR UNIT

TECHNICAL FIELD

The present invention relates to a reflecting mirror unit for use with a laser beam machine to set up the optical path of a laser beam.

BACKGROUND ART

FIG. 6 is a cross-sectional view showing a bend mirror device that is the conventional reflecting mirror unit as disclosed in JP-A-63-164701, for example. In FIG. 6, reference numeral 1 denotes a mirror, and reference numeral 3 denotes a mirror container for containing the mirror 1, in which the mirror 1 is fixed within this mirror container 3 by a pressing member 7. The pressing member 7 is provided with an air inlet opening 13 and an air outlet opening 15 to cool the mirror 1 through the air. Also, reference numeral 5 denotes a spherical body, reference numeral 9 denotes a screw for securing this spherical body 5 in the mirror container 3, reference numeral 17 denotes a carrier for carrying an outer circumferential face of the spherical body 5 around its inner spherical surface, reference numeral 25 denotes a cap that is secured to the carrier 17 by a screw 23, reference numeral 27 denotes an adjusting bolt attached on the cap 25, and reference numeral 35 denotes a block for securing the carrier 17.

The operation will be now set forth. An incident light Li is reflected at a point P on a reflection surface of the mirror 1, and becomes an emergent light Lo. The alignment of optical axis for this emergent light Lo, or the adjustment of angle of reflection for the mirror 1, is made by the adjusting bolt 27 that presses a back face of the mirror container 3 to force the spherical body 5 to change the angle of reflection while sliding with the carrier 17.

The conventional reflecting mirror unit is constituted as described above, and had a problem that after adjusting the angle (direction of the reflection surface) of the mirror 1 by the adjusting bolt 27, the angle of the mirror 1 was drifted due to the vibration and changes in the temperature, because there is no means for securing the mirror 1. For this measure, the maintenance such as a periodical inspection must be practiced, and required some skills to make the adjustments. Moreover, this amount of drift, including less uniform change with the time, resulted in poor reliability in the management of precision.

There was another problem that when the angle of the mirror 1 is fixed by applying more torque to the adjusting bolt 27 after adjustment, the fixing force is not applied uniformly, causing a moment to drift the angle of the mirror 1. Also, there was another problem that the residual stress caused by the fixing force is released with the elapse of the time, drifting the angle gradually.

An angle adjusting mechanism for the adjusting bolt 27 is not employed once the adjustment for the angle of the mirror 1 is finished, except for rare cases including a failure of the reflecting mirror unit or an exchange of the parts. However, since the angle adjusting mechanism is always integrated with the reflecting mirror unit main body in a normal state, namely, while the laser beam machine is being used, the back face portion of the mirror 1 is increased, and the reflecting mirror unit is thickened as a whole as indicated by size t in FIG. 6.

As described above, the angle adjusting mechanism that is not usually employed is integrated with the reflecting mirror unit, whereby there was another problem that it is difficult to reduce the reflecting mirror unit in weight and size, and it is likely to interfere with other components.

In the conventional example, though a concave portion that is formed inside the carrier 17 sliding with the outer circumferential face of the spherical body 5 is a spherical surface, it is practically required to have some interstice between both spherical surfaces (i.e., a convex spherical surface and a concave spherical surface) of the spherical body 5 and the carrier 17 to allow the operation of inserting the spherical body 5 and adjusting the angle of the mirror 1. Therefore, it is necessary that the concave shape (i.e., concave spherical surface) inside the carrier 17 is formed to have a slightly greater radius of curvature than the spherical shape (convex spherical surface) of the outer circumferential face of the spherical body 5. When both the faces of the carrier 17 and the spherical body 5 are worked as the spherical surfaces (i.e., concave spherical surface and convex spherical surface), they are not easily finished at a desired precision. Hence, in practice, the spherical surface of the spherical body 5 and the concave spherical surface of the carrier 17 are not contact over a certain area, and a part of the spherical surface of the spherical body 5 inscribed by the concave spherical surface of the carrier 17 is mostly an end portion of a circular arc of the concave spherical surface inside the carrier 17, or an edge portion 18. The edge portion 18 is usually deformed due to working distortion, and is so thin as to be prone to the elastic deformation and plastic deformation owing to a stress. Hence, there was a further problem that, when the spherical body 5 is pressed onto the edge portion 18 to cause a stress concentration, the edge portion 18 that is a contact portion is easily deformed, giving rise to a drift in the angle of the mirror 1.

This invention has been achieved to solve the above-mentioned problems, and it is an object of the invention to provide a reflecting mirror unit which can be retained firmly in a fixed state after adjusting the angle of a mirror, and that can be reduced in size (thickness) and weight.

DISCLOSURE OF THE INVENTION

The present invention provides a reflecting mirror unit comprising a mirror, mirror holding means for holding the periphery of the mirror, in which an outer circumferential portion perpendicular to a reflection surface of the mirror is shaped like a circular arc in cross section, a first carrier that is contact with a part of the outer circumferential portion on the mirror reflection surface side for the mirror holding means at a part of its inner conical surface, a second carrier that is opposed via the mirror holding means to the first carrier, and is contact with a part of the outer circumferential portion on the mirror back face side for the mirror holding means at a part of the inner conical surface, and pressure securing means for pressing the first carrier and the second carrier against the mirror holding means.

Accordingly, the surface of the mirror holding means and the surface of the first carrier have a straight line and a circular arc contacted, respectively, as seen in cross section, but the contact between the straight line and the circular arc is more beneficial in view of the practical working precision than the contact between the circular arcs, and a contact portion between the mirror holding means and the first carrier is less likely to be deformed. Consequently, the adjustment for the angle of mirror can be made at higher precision, and the mirror is held and fixed securely, so that the drift in the angle of the mirror can be reduced greatly.

Also, this invention provides a reflecting mirror unit that consists of a unit main portion having a mirror, mirror holding means for holding the periphery of the mirror, in which an outer circumferential portion perpendicular to a reflection surface of the mirror is shaped like a circular arc in cross section, a first carrier that is contact with a part of the outer circumferential portion on the mirror reflection surface side for the mirror holding means at a part of its inner conical surface, a second carrier that is opposed via the mirror holding means to the first carrier and is contact with a part of the outer circumferential portion on the mirror back face side for the mirror holding means at a part of the inner conical surface, and pressure securing means for pressing the first carrier and the second carrier against the mirror holding means, and mirror adjusting means, which is provided to be separable from the unit main portion, for adjusting a reflection direction of the mirror in a state where the mirror holding means and the first carrier are contacted.

Accordingly, the mirror adjusting means is separable from the unit main portion having a main portion of the reflecting mirror unit including the second carrier, so that the reflecting mirror unit can be reduced in size, and inparticular in thickness and weight.

Also, this invention provide a reflecting mirror unit with an elastic member having a finite width in an inner circumferential direction in a range of the inner conical surface of the second carrier including a contact area with the mirror holding means.

Accordingly, the mirror can be fixed more precisely to prevent the drift in the angle of the mirror (reflection direction) in the fixing operation.

BEST MODE FOR CARRYING OUT THE INVENTION

Embodiment 1

Figure 1:
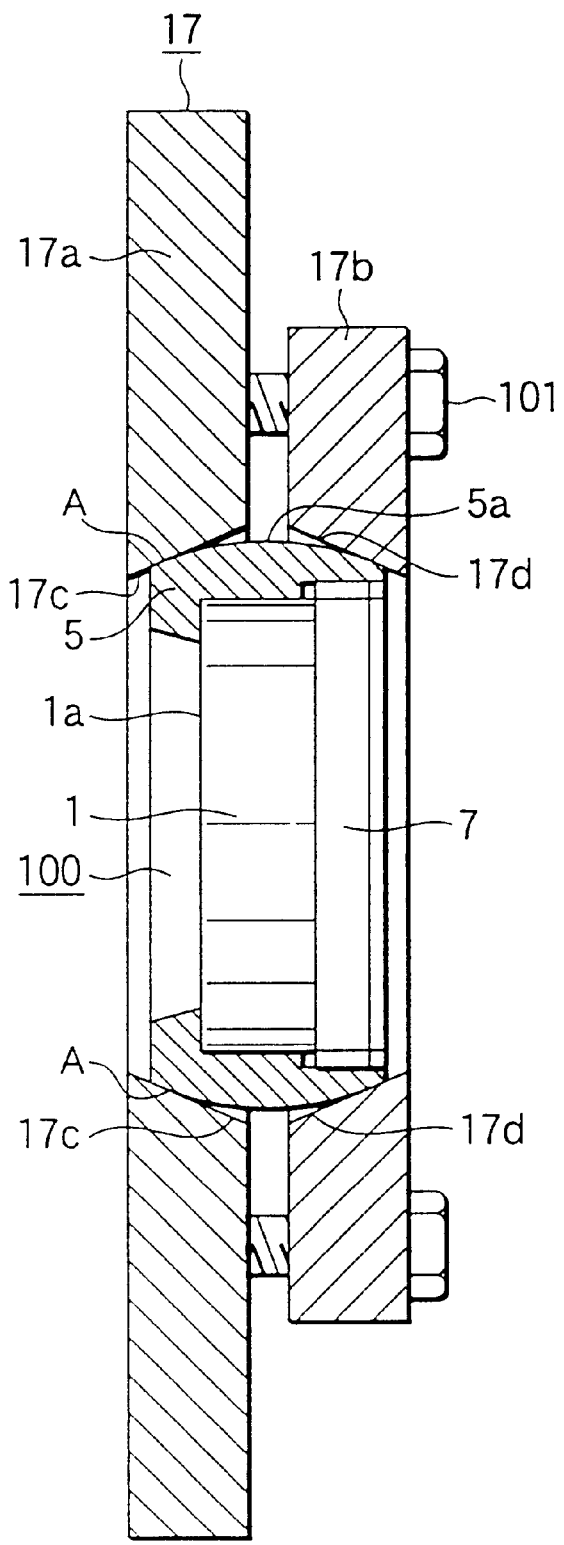
FIG. 1 is a schematic cross-sectional view for explaining a reflecting mirror unit according to a first embodiment of the present invention.
Figure 2:
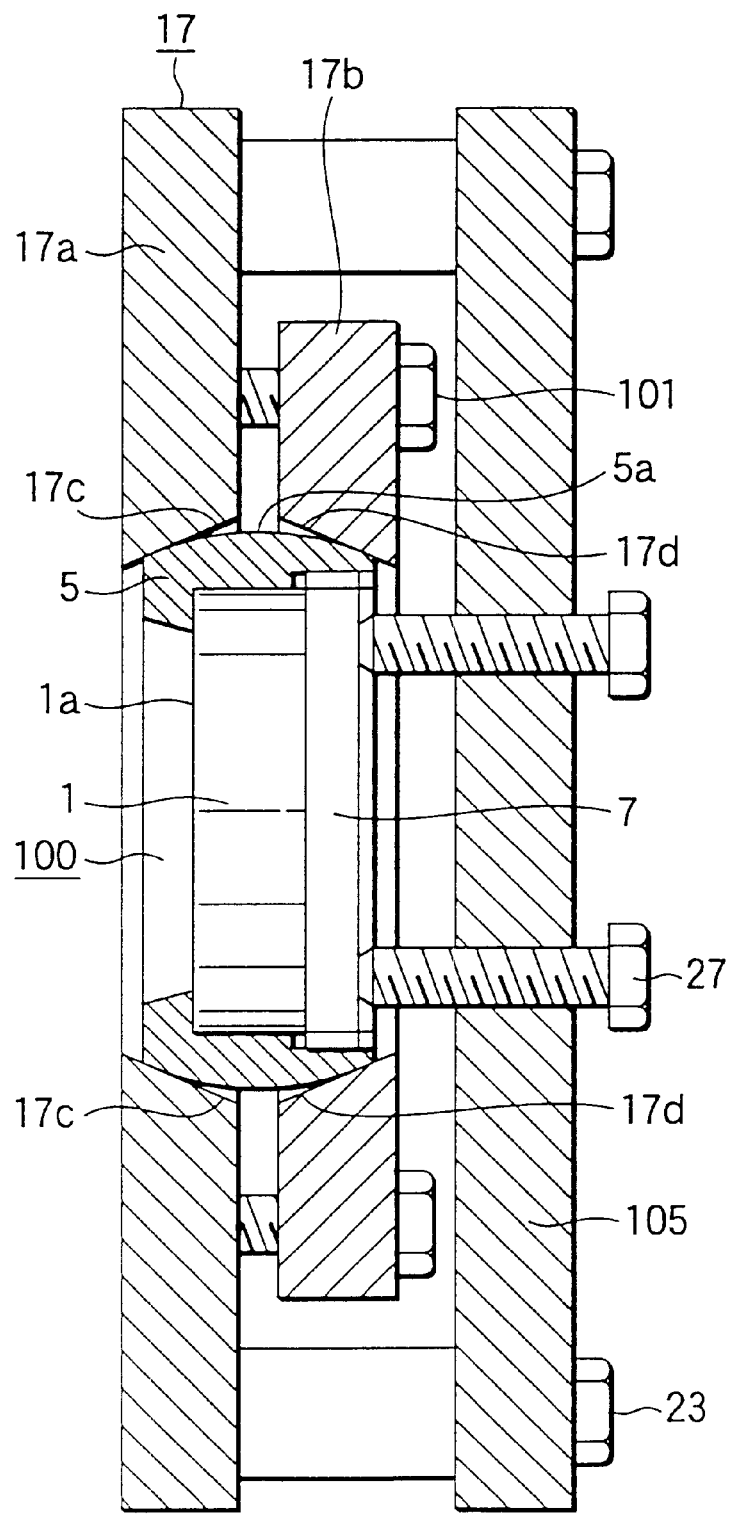
FIG. 2 is a schematic cross-sectional view for explaining mirror adjusting means that is detachable from the reflecting mirror unit according to the first embodiment of the invention.
Figure 3:
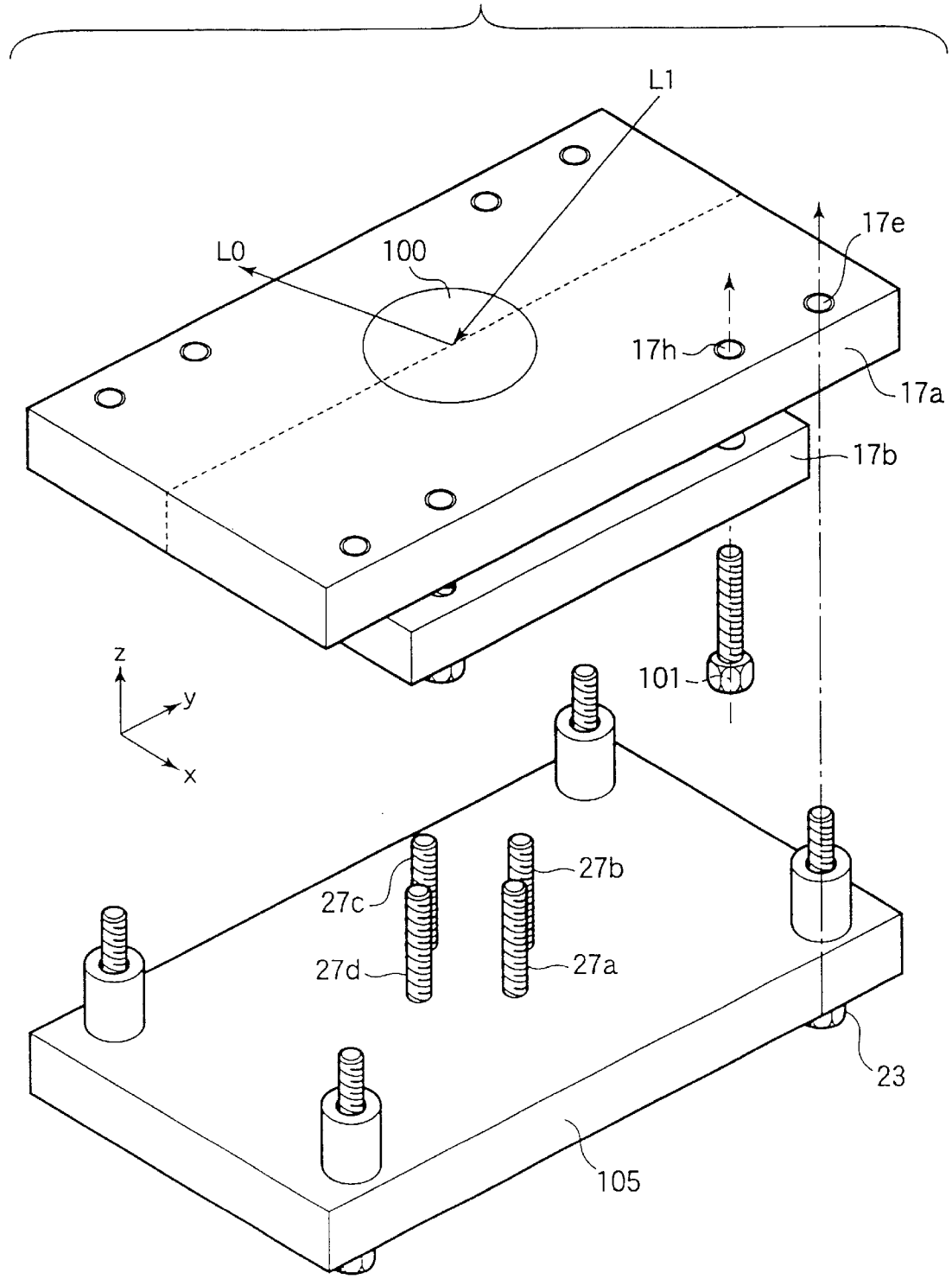
FIG. 3 is a perspective view for explaining the mirror adjusting means that is detachable from the reflecting mirror unit according to the first embodiment of the invention.

FIGS. 1 to 3 are explanatory views for explaining a reflecting mirror unit according to a first embodiment of the present invention. FIG. 1 shows a normal state of the reflecting mirror unit, where angle adjustment means for the mirror is not mounted. FIGS. 2 and 3 show a state where the mirror adjusting means is incorporated to adjust the angle of mirror.

In FIGS. 1 to 3, reference numeral 1 denotes a mirror, reference numeral 5 denotes a spherical body as mirror holding means for holding the periphery of the mirror 1, with a convex shaped portion having a circular arc section around an outer circumference, and reference numeral 7 denotes a pressing member for securing the mirror 1 onto the spherical body 5. Three members including the mirror 1, the spherical body 5 and the pressing member 7 are integrally referred to as a reflector 100.

Reference numeral 17 denotes a carrier for securely carrying the spherical body 5, in which this carrier 17 is divided into a reflection surface side carrier 17a as a first carrier and a back face side carrier 17b as a second carrier, as shown in the figure.

A conical concave shaped portion 17c is formed inside the reflection surface side carrier 17a, and a conical concave shaped portion 17d is formed inside the back face side carrier 17b. As shown in FIG. 1, the surface of the concave shaped portion 17c for the reflection surface side carrier 17a and the surface of the spherical body 5 are contacted at a point (A) where a straight line and a circular arc intersect, as seen in cross section, to hold and secure the spherical body 5 in this contact state. The surface of the concave shaped portion 17d for the back face side carrier 17b and the surface of the spherical body 5 are also contacted in the same manner.

Working the inner surface of the reflection surface side carrier 17a like a conical shape is more beneficial in view of the higher surface precision than working it like a concave spherical shape as conventionally made. Since the surface of the concave shaped portion 17c for the reflection surface side carrier 17a and the surface of the spherical body 5 are contacted at the point between the straight line and the circular arc as seen in cross section, as described above, consequently, the adjustment for the angle of the mirror can be made at higher precision, and the mirror 1 can be held and fixed more securely than when they are contacted between the circular arcs as conventionally practiced.

Reference numeral 101 denotes a screw as pressure fixing means for fixing the spherical body 5 that has completed the angle adjustment by inserting it into a fixing tapped hole 17h.

Further, reference numeral 105 denotes an adjusting plate, reference numeral 23 denotes a temporary screw thread for adjusting plate for temporarily fixing the adjusting plate 105 to the carrier 17 by inserting it into a tapped hole 17e for adjusting plate, and reference numeral 27 (27a, 27b, 27c, 27d) denotes an adjusting bolt attached to the adjusting plate 105 to adjust the angle of the spherical body 5, as shown in FIGS. 2 and 3. The adjusting plate 105, the screw thread 23 and the adjusting bolt 27 have a function as mirror adjusting means.

The adjustment for the angle of the mirror 1 and the fixing of the mirror 1 in the reflecting mirror unit according to this embodiment will be set forth below. The xyz coordinate system as shown in FIG. 3 is employed for the following explanation.

Firstly, the adjusting plate 105 is fixed directly or indirectly via the back face side carrier 17b to the reflector 100 or the reflection surface side carrier 17a with which the spherical body 5 is contacted by the temporary screw thread 23 for adjusting plate. In this state, four screws 101 for pressing and securing the back face side carrier 17b are loosened. Then, while each adjusting bolt 27 is abutted against the pressing member 7, the adjustment for the angle of the mirror 1 in the zx plane is made by pushing or pulling the adjusting bolts 27a and 27c, and the adjustment for the angle of the mirror 1 in the yz plane is made by pushing or pulling the adjusting bolts 27b and 27d.

After the adjustment for the angle is ended, the mirror 1 is fixed by tightening the screws 101 with the reflector 100 sandwiched between the carriers 17a and 17b. Finally, the temporary screw thread 23 for adjusting plate is loosened, and the adjusting plate 105 is removed from the reflection surface side carrier 17a.

In this invention, the mirror angle adjusting means, which was provided integrally and inseparably in a conventional example, is made separable and detachable from a main body of the reflecting mirror unit. In this way, an angle adjusting mechanism that is usually not employed is removed from the main body of the reflection surface unit, once the adjustment for the angle of the mirror 1 is ended. Hence, the reflecting mirror unit can be reduced in weight and size in the normal service condition, and prevented from interfering with other components because the reflecting mirror unit is of smaller size.

Also, in this invention, the concave shaped portion formed in the carrier 17a has a conical shape. In the case of the conical shape, a contact portion between the spherical body and the carrier can be set at a desired position relatively easily by adjusting the angle between the generating line and the center line. As previously described, working the inner surface like the conical shape can be made at higher precision than working it like the spherical surface.

To prevent plastic deformation due to concentration of stress on a contact face between the carrier 17 and the reflector 100, the contact face is preferably subjected to a hardening treatment. The hardening treatment is suitably an alumite treatment.

In the first embodiment, the reflector 100 has a divided structure of three components including the mirror 1, the spherical body 5 and the pressing member 7, in which the mirror 1 is exchanged easily and cheaply. For instance, by removing the pressing member 7 from the back face side of the spherical body 5, even after the reflector 100 or the spherical body 5 is fixed, the mirror 1 can be detached from the spherical body 5, whereby there is no need of making the alignment for the optical axis every time the mirror 1 is exchanged. However, it is necessary to reduce the weight and the number of parts, and in the case where it is considered that the mirror 1 is exchanged less frequently, the spherical body 5 and the mirror 1 may be integrated as a molded product.

Embodiment 2

Figure 4:
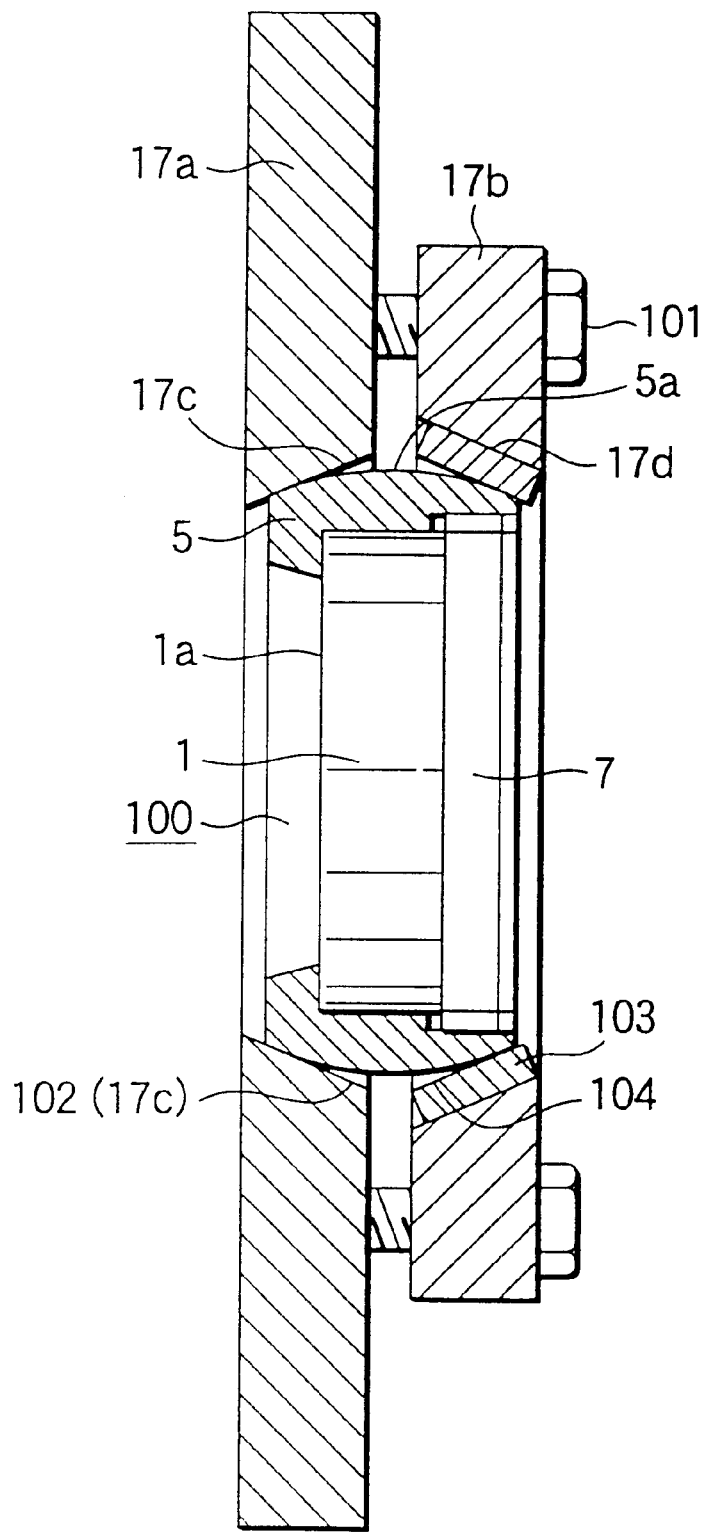
FIG. 4 is a schematic cross-sectional view for explaining a reflecting mirror unit according to a second embodiment of the present invention.

FIG. 4 is a schematic view for explaining a reflecting mirror unit according to a second embodiment of the invention. In FIG. 4, the same or like parts are designated by the same numerals as in FIGS. 1 to 3.

In FIG. 4, reference numeral 102 denotes a high friction factor face provided on a surface of the concave shaped portion 17c that is a contact face between the carrier 17a and the spherical body 5, and reference numeral 103 denotes a sheet-like elastic body as an elastic member formed on a surface of the concave shaped portion 17d that is a contact face between the back face side carrier 17b and the spherical body 5. Moreover, in this embodiment, a low friction factor face 104 is provided on a surface of the sheet-like elastic body 103.

The adjustment for the angle of the mirror 1 and the fixing of the mirror 1 in this second embodiment are fundamentally made in the same way as in the first embodiment.

Figure 5:
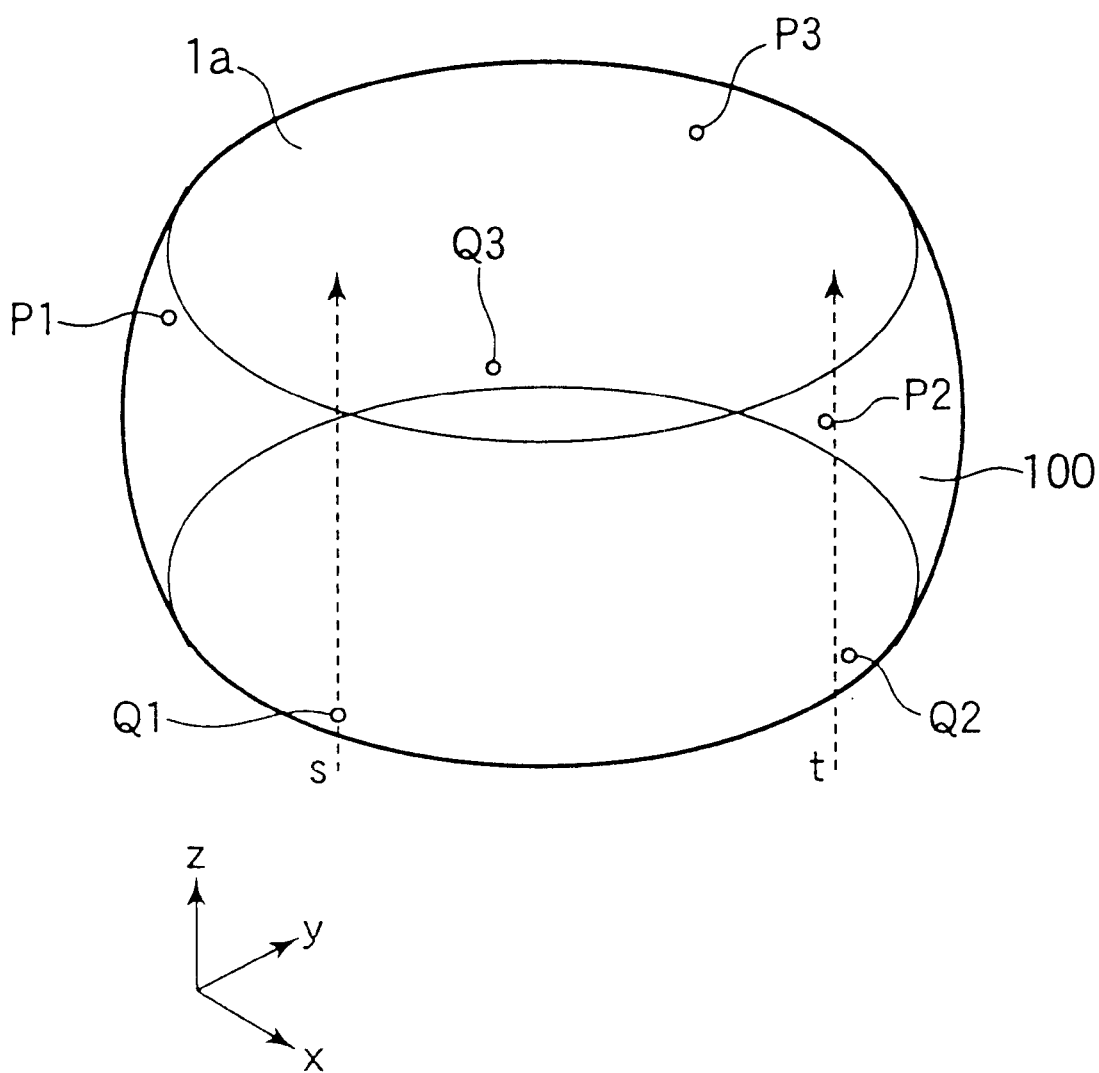
FIG. 5 is a view for explaining a pressed/fixed state of a reflector.
Figure 6:
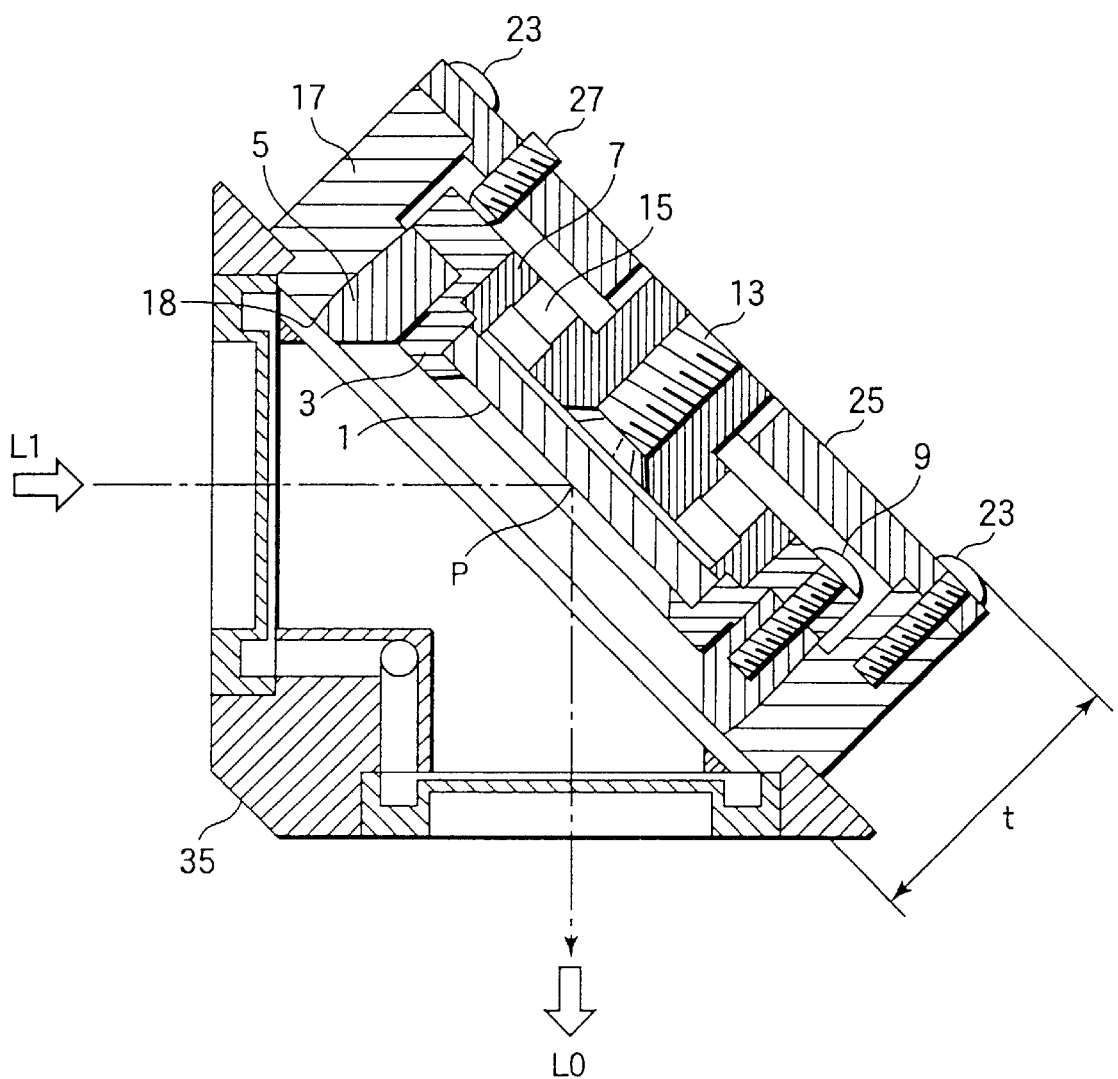
FIG. 6 is a view for explaining the conventional reflecting mirror unit.

Referring to FIGS. 4 and 5, a phenomenon that usually occurs in fixing the mirror 1 will be now set forth. FIG. 5 is a perspective view of the spherical body 5 alone as shown in FIG. 4, which is simplified for easy understanding. In FIG. 5, the upper face side is contact with the reflection surface side carrier 17a having a reflection surface of the mirror 1, and the lower face side is contact with the back face side carrier 17b on the back face side of the mirror 1.

As described above in the first embodiment, the reflection surface side carrier 17a and the spherical body 5 are contacted ideally at a point around the circumference (i.e., a contact point between a taper section of the carrier 17a and a circular arc of the reflector 100) after the adjustment for the mirror 1 is ended. In practice, however, they are contacted at three points (P1, P2, and P3) due to the reason of the precision of both the surfaces. If the spherical body 5 is fixed while being carried by the reflection surface side carrier 17a at the three points, the drift in adjustment does not occur. However, in the case where the spherical body 5 is simply fixed by the back face side carrier 17b pressing it from the back face side, the back face side carrier 17b and the spherical body 5 are contacted at three points (Q1, Q2, Q3) in the same way as when the reflection surface side carrier 17a and the spherical body 5 are contacted, as shown in FIG. 5. A pressing point Q2 is rarely present on a line of action t passing through a contact point P2, and in practice, it is usually off the line of action such as point P1 and point Q1. If a securing force is applied to point Q1 in this state, the spherical body 100 is displaced with the points P1 and P2 as the supporting points, because there is no contact point serving as a fulcrum on the line of action s. That is, there occurs a drift in the angle of the reflection surface 1a for the mirror 1. Along with this displacement, the point of application Q1 is moved. In this manner, there occurs a drift in the angle of the mirror 1. The drift in the angle of the mirror 1 owing to such phenomenon is slight, but the misalignment of the optical axis is increased in proportion to the distance from the reflection surface, possibly resulting in a significant error far away.

To avoid this drift in the angle of the mirror 1 and effect the adjustment for the angle of the mirror 1 at higher precision, the contact between the back face side carrier 17b and the spherical body 5 is made in a significant area, rather than only at three points, to eliminate the concentration of stress, and suppress the drift that may occur during the fixing operation, as shown in FIG. 4. For this purpose, to disperse the stress applied from the back face side carrier 17b to the spherical body 5, an annular sheet-like elastic body 103 is provided around the conical surface of the back face side carrier 17b. Moreover, a low friction factor face 104 is formed on a surface of this sheet-like elastic body 103, suppressing a moving force exerting on the reflector 100 (spherical body 5) due to a frictional force caused by a elastic deformation or movement of the spherical body 5 and the back face side carrier 17b during the fixing operation.

On the other hand, a high friction factor face 102 should be formed on a surface of the concave shaped portion 17c not to dislocate the contact point P, thereby suppressing the drift in the angle of the mirror 1 occurring during the fixing operation once the angle of the mirror 1 is determined.

As the high friction factor face, the roughness of the face may be raised to increase the frictional force, or a magnetic suction force may be applied on the contact face, for example.

Industrial Applicability

As described above, the reflecting mirror unit according to the present invention is suitably employed in a three dimensional laser machine, for example.

What is claimed is:

1. A reflecting mirror unit characterized by comprising a mirror, mirror holding means for holding the periphery of the mirror, in which an outer circumferential portion perpendicular to a reflection surface of the mirror is shaped like a circular arc in cross section, a first carrier that is in contact with a part of the outer circumferential portion on the mirror reflection surface side of the mirror holding means at a part of an inner conical surface of the first carrier, a second carrier that is opposed via the mirror holding means to the first carrier, and is in contact with a part of the outer circumferential portion on the mirror back face side of the mirror holding means at a part of an inner conical surface of the second carrier, and pressure securing means for pressing the first carrier and the second carrier against the mirror holding means.

2. A reflecting mirror unit characterized by comprising a unit main portion having a mirror, mirror holding means for holding the periphery of the mirror, in which an outer circumferential portion perpendicular to a reflection surface of the mirror is shaped like a circular arc in cross section, a first carrier that is in contact with a part of the outer circumferential portion on the mirror reflection surface side of the mirror holding means at a part of an inner conical surface of the first carrier, a second carrier that is opposed via the mirror holding means to the first carrier, and is in contact with a part of the outer circumferential portion on the mirror back face side of the mirror holding means at a part of an inner conical surface of the second carrier, and pressure securing means for pressing the first carrier and the second carrier against the mirror holding means; and mirror adjusting means, which is provided to be separable from the unit main portion, for adjusting a reflection direction of the mirror in a state where the mirror holding means and the first carrier are contacted.

3. The reflecting mirror unit according to claim 1, characterized in that an elastic member having a finite width in an inner circumferential direction is provided in a range of the inner conical surface of the second carrier including a contact area with the mirror holding means.

* * * * *